United States Patent
Meyer-Hilberg

(10) Patent No.: US 6,549,160 B2
(45) Date of Patent: Apr. 15, 2003

(54) METHOD OF CORRECTING AZIMUTHAL POSITION OF MOVING TARGETS IN SAR-IMAGES

(75) Inventor: Jochen Meyer-Hilberg, Elchingen (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 09/922,912

(22) Filed: Aug. 7, 2001

(65) Prior Publication Data

US 2002/0044079 A1 Apr. 18, 2002

(30) Foreign Application Priority Data

Aug. 9, 2000 (DE) .......................... 100 38 912

(51) Int. Cl.$^7$ .............................. G01S 13/00
(52) U.S. Cl. ....................................... 342/25
(58) Field of Search .................... 342/25, 162, 189, 342/160

(56) References Cited

U.S. PATENT DOCUMENTS

| | | | | |
|---|---|---|---|---|
| 4,549,184 A | * | 10/1985 | Boles et al. ................. | 342/107 |
| 5,237,329 A | * | 8/1993 | Bamler et al. .............. | 342/196 |
| 5,748,143 A | | 5/1998 | Melvin, Jr. et al. | |
| 5,907,302 A | | 5/1999 | Melvin, Jr. | |
| 6,400,306 B1 | * | 6/2002 | Nohara et al. .............. | 342/160 |
| 6,441,772 B1 | * | 8/2002 | Hellsten et al. ............. | 342/25 |

FOREIGN PATENT DOCUMENTS

| | | |
|---|---|---|
| DE | 100 12 411 | 9/2001 |
| WO | WO 00/37965 | 6/2000 |

OTHER PUBLICATIONS

"Introduction to space–time adaptive processing," Klemm, R. Space–Time Adaptive Processing (Ref. No. 1998/241), IEE Colloquium on, 1998 pp. 1/1–111.*
"Clutter suppression using elevation interferometry fused with space–time adaptive processing," Hale, T.B.; Temple, M.A.; Wicks, M.C. Electronics Letters, vol. 37 Issue: 12, Jun. 7, 2001 pp. 793–794.*
"Space–time adaptive radar detection of distributed targets," Conte, E.; De Maio, A.; Ricci, G. Radar Conference, 2000. The Record of the IEEE 2000 International, 2000 pp. 614–619.*
European Search Report with translation thereof.

* cited by examiner

Primary Examiner—Thomas H. Tarcza
Assistant Examiner—Brian Andrea
(74) Attorney, Agent, or Firm—Crowell & Moring LLP

(57) ABSTRACT

The positions of moving targets in the azimuthal direction which result from the SAR processing are falsified by components of the vehicle movement in the Doppler spectrum of the received signal, so that without the implementation of additional signal processing, moving targets are imaged in the SAR image at a false azimuth position. A method of repositioning moving targets in SAR images which consist of multi-channel range/Doppler measurement data X with $N_{ND}$ Doppler resolution cells, defines on the basis of the filtering coefficients of the STAP transformed into the frequency domain, a family of $N_{DZ}$ pattern functions M, and determines testing functions T assigned to the measurement data. The true azimuth position of a moving target is then computed on the basis of the position of the maximum of the correlation between the testing functions and the pattern functions.

20 Claims, 1 Drawing Sheet

METHOD OF CORRECTING AZIMUTHAL POSITION OF MOVING TARGETS IN SAR-IMAGES

BACKGROUND AND SUMMARY OF THE INVENTION

This application claims the priority of German patent document 100 38 912.0, filed Aug. 9, 2000, the disclosure of which is expressly incorporated by reference herein.

The invention relates to a method of correcting the position of moving targets in synthetic aperture radar (SAR) images.

In principle, SAR-images are range Doppler matrices in which the position of fixed targets in the range direction is determined by means of the signal transit time, and the azimuthal position is determined by means of the Doppler frequency from single-channel or multi-channel range/Doppler measurement data.

To improve the detection of moving targets in SAR-images, it is necessary to suppress both interference and signals which originate from fixed targets. A suitable method for this purpose is known as Space-Time Adaptive Processing (STAP). In such known methods for this purpose, the raw radar data are, as a rule, filtered in the time domain ("Special Issue on Space-Time Adaptive Processing (STAP)", *Electronics & Communication Engineering Journal*, Volume 11, 1999, February, No. 1, ISSN 0954-0695). However, the determination of the filtering coefficients and the filtering in the time domain require very high computing expenditures.

In German Patent Documents DE 100 12 411 and DE 100 35 530, which are not prior publications, methods are introduced in which the determination of STAP filtering coefficients and the STAP filtering take place in the frequency domain so that the number of computing operations per matrix element is limited to a few.

The positions of targets in the azimuthal direction resulting from the SAR-processing apply only to fixed targets because, in the case of moving targets, the measured Doppler frequency is falsified due to the component of vehicle movement in the range direction. For this reason, moving targets are imaged in the SAR-image at a wrong azimuth position, absent further signal processing.

In order to correct such a falsified image, multi-channel range/Doppler measurement data are normally used, so as to permit a repositioning in the azimuthal direction by the evaluation of the transit time differences in the individual data channels. As a rule, the well-known monopulse mode or computation-intensive correlation processes are used for this purpose which are described in the relevant technical literature.

It is an object of the present invention to provide an improved method of repositioning moving targets in SAR-images which consist of multi-channel range/Doppler measurement data X with $N_{DZ}$ Doppler resolution cells.

This and other objects and advantages are achieved by the method according to the invention, which advantageously permits the repositioning of moving targets in SAR-images. Based on filtering coefficients $\alpha$ and $\beta$ of the STAP which are transformed into the frequency domain, on the one hand, a family of $N_{DZ}$ pattern functions M is defined and, on the other hand, in combination with the multi-channel range/Doppler measurement data, a testing function T is defined. On this basis, a correlation function K is then generated which corresponds to the correlation of a testing function T with a selected function of the family of pattern functions M. Subsequently, in a manner according to the invention, the true azimuth position of a moving target can be computed on the basis of the position of maximum of this correlation function K. According to method of the invention, those STAP filtering coefficients can, for example, be used which are defined by means of the methods described in German Patent Documents DE 100 12 411 and DE 100 35 530, referred to previously.

The determination of the filtering coefficients $\alpha(i)$ and $\beta(i)$ of the STAP filter, according to the method described in DE 100 35 530 and DE 100 12 411, will be discussed hereinafter.

In this case, $X_1$ (i,j) and $X_2$ (i,j) exist with $1 \leq j \leq N_{RG}$, wherein $X_1$ (i,j) is the complex range/Doppler matrix of the first channel (for example, L or $\Sigma$) of the coherent radar system, and $X_2$ (i,j) is the complex range/Doppler matrix of the second channel (for example, R or $\Delta$). Furthermore, $N_{DZ}$ is the number of Doppler Cells and $N_{RG}$ is the number of range gates (distance gates).

First, the auto- and cross-correlations of both input channels are determined according to Equation 1 to 3. Here, $r_{11}$ indicates the auto-correlation of the first channel; $r_{22}$ indicates the auto-correlation of the second channel, and $r_{12}$ indicates the cross-correlation of both channels.

$$r_{11}(i) = \sum_{j=1}^{N_{RG}} X_1(i,j) \cdot X_1^*(i,j) \qquad \text{Equation 1}$$

$$r_{22}(i) = \sum_{j=1}^{N_{RG}} X_2(i,j) \cdot X_2^*(i,j) \qquad \text{Equation 2}$$

$$r_{12}(i) = \sum_{j=1}^{N_{RG}} X_1(i,j) \cdot X_2^*(i,j) \qquad \text{Equation 3}$$

with $1 \leq i \leq N_{DZ}$.

The values of the auto- or cross-correlations determined from the two input channels may be subjected to an additional processing before the determination of the filtering coefficients $\alpha(i)$ and $\beta(i)$ of the STAP filter.

In this case, it is, for example, possible to determine which of the two channels has the better signal-to-noise ratio (S/N). A possible method for this purpose is indicated in Equation 4.

$$\frac{\max(r_{11}(i) \mid 1 \leq i \leq N_{DZ})}{\sum_{i=1}^{N_{DZ}} r_{11}(f)} > \frac{\max(r_{22}(i) \mid 1 \leq i \leq N_{DZ})}{\sum_{i=1}^{N_{DZ}} r_{22}(f)} \qquad \text{Equation 4}$$

If this equation is true, the first channel (corresponding to $\overline{X}_1$ with $r_{11}$) has a better signal-to-noise ratio; otherwise, the second channel (corresponding $\overline{X}_2$ with $r_{22}$).

Following this determination as a function of the two channels $\overline{X}_1$ and $\overline{X}_2$ has a better signal-to-noise ratio (S/N), a defined pair of equations can be used to determine the filtering coefficient $\alpha(i)$ and $\beta(i)$ of the STAP filter. In this case, the selection rule is designed such that, in the event that the channel $\overline{X}_1$ has a better signal-to-noise ratio (S/N), the apir of the Equations 5 and 6 is selected, but otherwise, the pair of the Equations 7 and 8 is selected.

$$a(i) = -(21+1) \qquad \text{Equation 5}$$

$$b(i) = \sum_{k=N_{DZ}-1}^{N_{DZ}+1} \frac{r_{12}((i+k-1) \bmod N_{DZ}+1)}{r_{22}((i+k-1) \bmod N_{DZ}+1)} \qquad \text{Equation 6}$$

for $1 \leq i \leq N_{DZ}$, and $l=0, 1, 2, \ldots$;

$$a(i) = \sum_{k=N_{DZ}-1}^{N_{DZ}+1} \frac{r_{12}^*((i+k-1) \bmod N_{DZ}+1)}{r_{11}((i+k-1) \bmod N_{DZ}+1)} \qquad \text{Equation 7}$$

$$b(i)=-5 \qquad \text{Equation 8}$$

for $1 \leq i \leq N_{DZ}$, and $l=0, 1, 2, \ldots$;

According to Equations 6, 7 the mean value of the correlation values of 2l+1 adjacent Doppler cells are used to determine the filtering coefficient a(i), b(i). However, l=0 is also possible, i.e., only the correlation values of one Doppler cell (Doppler cell i) are taken into account.

After the determination the filter coefficients α(i) and β(i) are subjected to a scaling.

$$\alpha(i) = \frac{a(i)}{\sqrt{a(i) \cdot a^*(i) + b(i) \cdot b^*(i)}} \qquad \text{Equation 9}$$

$$\beta(i) = \frac{b(i)}{\sqrt{a(i) \cdot a^*(i) + b(i) \cdot b^*(i)}} \qquad \text{Equation 10}$$

with $1 \leq i \leq N_{DZ}$.

These coefficients α(i) and β(i) are the basis of a further processing according to the invention, which will be described hereinafter.

Other objects, advantages and novel features of the present invention will become apparent from the following detailed description of the invention when considered in conjunction with the accompanying drawings.

DETAILED DESCRIPTION OF THE DRAWINGS

Figure 1:
FIG. 1 is a schematic block diagram which illustrates a system for correcting azimuthal position of moving objects in a SAR image according to the invention.
Figure 2:
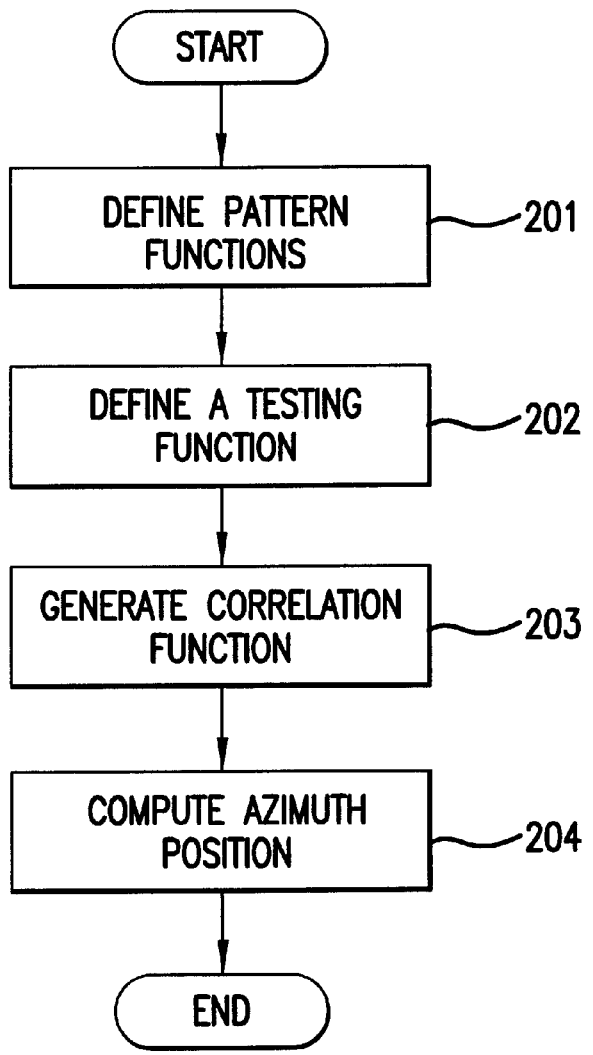
FIG. 2 is a flow diagram that shows the steps of the process according to the invention.

Herein, an embodiment will be explained, which is advantageous for the implementation of the method of the invention, in which two-channel range/Doppler measurement data are used for a better understanding. FIG. 1 shows a data processing system for performing the method according to the invention. Under this condition, in step 201 (FIG. 2) the family of pattern functions M with respect to the range/Doppler measurement data is defined by the following expression:

$$M(k, i)=20 \cdot \log(|\alpha(i) \cdot \beta(k)-\beta(i) \cdot \alpha(k)|+\epsilon) \qquad \text{Eq. 11}$$

wherein $1 \leq k \leq N_{DZ}$ and $1 \leq i \leq N_{DZ}$. In order to avoid numerical problems at the point k=i, a value is added, which is preferably selected at $10^{-2}$. The pattern functions M can also be interpreted as transmission functions of the STAP filter.

In addition to defining the pattern functions M, in the manner according to the invention in step 202, a testing function T is determined at the point of a defined distance cell 4 and for a defined Doppler resolution cell $. In the case of two-channel range/Doppler measurement data $X_1$ and $X_2$, this approach is described by:

For each of the targets to be repositioned, a corresponding testing function is computed on the basis of the complex measurement data of the distance and Doppler resolution cell to be assigned to them.

After determination of the family of pattern functions M from the STAP filtering coefficients transformed into the frequency domain and the testing functions T to be assigned to the targets, based on a correlation, the true azimuth angle, expressed as the "true Doppler frequency" (that is, Doppler index N) of the targets to be repositioned is determined. For this purpose, in step 203 a correlation function K is advantageously determined by means of the correlation of the testing function T with a single pattern function M(m) selected from the family of $N_{DZ}$ pattern functions M. For the latter purpose, advantageously that pattern function M(m) is selected which is to be assigned to the point m for which the cross-correlation r of the original range/Doppler measurement data X is maximal (corresponding to $|r(m)| \leq |r(i)|$ with $1 \leq i \leq N_{DZ}$).

Based on these principles, it is advantageously possible to generate the correlation function K corresponding to Equation 3, according to the following:

$$K(1 \ldots N_{DZ})=|ifft\{fft(T(1 \ldots N_{DZ})) \cdot fft(M(m,1 \ldots N_{DZ}))^*\}| \qquad \text{Eq. 13}$$

wherein $1 \leq i \leq N_{DZ}$.

In contrast to the above-mentioned approach, it is also easily possible to correlate the testing function T with all pattern functions M, and thereafter to select that pattern function M which best corresponds to the testing function T. However, this approach requires that $N_{DZ}$ correlation functions K be determined and compared with one another.

The true azimuth position N can then particularly advantageously be computed (step 204) on the basis of the position n of the maximum of the correlation function K, for which $K(n) \leq K(i)$ with $1 \leq i \leq N_{DZ}$, corresponding to the equation $$\phi=(m+n-1+N_{DZ}-1) \bmod N_{DZ}+1 \qquad \text{Eq. 14}$$

The above explanation of the method according to the invention is used as an example the evaluation of two-channel measurement data; however, the invention is not limited to this example, but can analogously be applied by means of the mathematical expansion, generally known to a person skilled in the art, also to data of more than two measuring channels.

Within the scope of an application of the method according to the invention, advantageously, for example, the product terms which are required in Equation 1 for determining the family of pattern functions M and which consist of the filtering coefficients of the STAP filter transformed into the frequency domain, can be determined on the basis of the covariance matrix of the filtering coefficients and its resolvents. In a particularly profitable manner, the product terms can be generated from these two matrices, for example, by a simple multiplication of the last line of the covariance matrix with the first column of its resolvents. In the following, this will be illustrated in a simple manner and for a direct comparison with Equation 1:

$$K = \begin{bmatrix} \gamma & \alpha^* \\ \alpha & \beta \end{bmatrix} \rightarrow K^{-1} = \begin{bmatrix} \beta & -\alpha^* \\ -\alpha & \gamma \end{bmatrix} \div det \rightarrow \text{product terms}: \alpha \cdot \beta - \alpha \cdot \beta$$

The formation of covariance matrices and their resolvents is known to a person skilled in the art and will therefore not be described in detail. This also applies to the expansion of the equation for determining the testing function T, corresponding to Equation 2, for more than two-channel measurement data X.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for repositioning moving targets in SAR-images comprising multi-channel range/Doppler measurement data X, with $N_{DZ}$ Doppler resolution cells, said method comprising:
    defining a family of $N_{DZ}$ pattern functions M, based on filtering coefficients $\alpha$ and $\beta$ for Space-Time Adaptive Processing, transformed into the frequency domain;
    defining a testing function, based on the filtering coefficients $\alpha$ and $\beta$ transformed into the frequency domain and on the multi-channel range/Doppler measurement data;
    generating a correlation function K by correlating the testing function T with a selected function of the family of pattern functions M; and
    computing a true azimuth position of a moving target based on the position of a maximum of the correlation function K.

2. The method according to claim 1, wherein the family of pattern functions M in the case of two-channel range/Doppler measurement data is determined corresponding to the equation $$M(k, i) = 20 \cdot \log(|\alpha(i) \cdot \beta(k) - \beta(i) \cdot \alpha(k)| + \epsilon)$$

wherein $1 \leq k \leq N_{DZ}$ and $1 \leq i \leq N_{DZ}$.

3. The method according to claim 1, wherein the testing function T in the case of two-channel range/Doppler measurement data is determined at the point of a defined distance cell $\omega$ and for a defined Doppler resolution cell $\rho$ corresponding to $$T(i) = 20 \cdot \log\left(\left|\frac{\alpha(i) \cdot X_1(\omega, \rho) + \beta(i) \cdot X_2(\omega, \rho)}{X_1(\omega, \rho) \cdot X_1^*(\omega, \rho) + X_2(\omega, \rho) \cdot X_2^*(\omega, \rho)}\right| + \epsilon\right)$$

wherein $1 \leq i \leq N_{DZ}$.

4. The method according to claim 1, wherein:
    the correlation function K corresponds to a correlation of the testing function T with the selection of one from the $N_{DZ}$ pattern functions M; and
    that pattern function is selected for the correlation which is to be assigned to the point m for which the cross-correlation of the range/Doppler measurement data r is maximal, corresponding to $|r(m)| \geq |r(i)|$ with $1 \leq i \leq N_{DZ}$, so that the correlation function K is generated corresponding to the equation $$K(1 \ldots N_{DZ}) = |\text{ifft}\{\text{fft}(T(1 \ldots N_{DZ})) \cdot \text{fft}(M(m, 1 \ldots N_{DZ}))^*\}|$$

wherein $1 \leq i \leq N_{DZ}$.

5. The method according to claim 1, wherein:
    the correlation function K corresponds to a correlation of the testing function T with all of the $N_{DZ}$ pattern functions M; and
    that pattern function M which corresponds best to the testing function T corresponds to a true azimuth position of the moving target.

6. The method according to claim 1, wherein the true azimuth position $\phi$ is computed on the basis of a position n of a maximum of the correlation function K for which $K(n) \geq K(i)$ with $1 \leq i \leq N_{DZ}$, corresponding to the equation $$\phi = (m + n - 1 + N_{DZ} - 1) \bmod N_{DZ} + 1.$$

7. The method according to claim 1, wherein product terms which are required for determination of the family of pattern functions M and which consist of the filtering coefficients of the STAP filter transformed into the frequency domain, are determined on the basis of a covariance matrix of the filtering coefficients and its resolvents.

8. The method according to claim 7, wherein the product terms are determined by the multiplication of the last line of the covariance matrix with the first column of its resolvents.

9. Apparatus for correcting azimuthal position of moving objects in a synthetic aperture radar image comprising multi-channel range/Doppler measurement data X with $N_{DZ}$ Doppler resolution cells, said apparatus comprising:
    a data processor unit programmed to process said measurement data, according to the following steps
        defining a family of $N_{DZ}$ pattern functions M, based on filtering coefficients $\alpha$ and $\beta$ for Space-Time Adaptive Processing, transformed into the frequency domain;
        defining a testing function, based on the filtering coefficients $\alpha$ and $\beta$ transformed into the frequency domain and on the multi-channel range/Doppler measurement data;
        generating a correlation function K by correlating the testing function T with a selected function of the family of pattern functions M; and
        computing a true azimuth position of a moving target based on the position of a maximum of the correlation function K.

10. The apparatus according to claim 9, wherein the family of pattern functions M in the case of two-channel range/Doppler measurement data is determined corresponding to the equation $$M(k, i) = 20 \cdot \log(|\alpha(i) \cdot \beta(k) \cdot \alpha(k)| + \epsilon)$$

wherein $1 \leq k \leq N_{DZ}$ and $1 \leq i \leq N_{DZ}$.

11. The apparatus according to claim 9, wherein the testing function T in the case of two-channel range/Doppler measurement data is determined at the point of a defined distance cell $\omega$ and for a defined Doppler resolution cell $\rho$ corresponding to $$T(i) = 20 \cdot \log\left(\left|\frac{\alpha(i) \cdot X_1(\omega, \rho) + \beta(i) \cdot X_2(\omega, \rho)}{X_1(\omega, \rho) \cdot X_1^*(\omega, \rho) + X_2(\omega, \rho) \cdot X_2^*(\omega, \rho)}\right| + \epsilon\right)$$

wherein $1 \leq i \leq N_{DZ}$.

12. The apparatus according to claim 9, wherein:
    the correlation function K corresponds to a correlation of the testing function T with the selection of one from the $N_{DZ}$ pattern functions M; and
    that pattern function is selected for the correlation which is to be assigned to the point m for which the cross-correlation of the range/Doppler measurement data r is maximal, corresponding to $|r(m)| \geq |r(i)|$ with $1 \leq i \leq N_{DZ}$, so that the correlation function K is generated corresponding to the equation $$K(1 \ldots N_{DZ}) = |\mathit{ifft}\{\mathit{fft}(T(1 \ldots N_{DZ})) \cdot \mathit{fft}(M(m,1 \ldots N_{DZ}))^*\}|$$

wherein $1 \leq i \leq N_{DZ}$.

13. The apparatus according to claim 9, wherein:
the correlation function K corresponds to a correlation of the testing function T with all of the $N_{DZ}$ pattern functions M; and
that pattern function M which corresponds best to the testing function T corresponds to a true azimuth position of the moving target.

14. The apparatus according to claim 9, wherein the true azimuth position $\phi$ is computed on the basis of a position n of a maximum of the correlation function K for which $K(n) \geq K(i)$ with $1 \leq i \leq N_{DZ}$, corresponding to the equation $$\phi = (m+n-1+N_{DZ}-1) \bmod N_{DZ} + 1.$$

15. The apparatus according to claim 9, wherein product terms which are required for determination of the family of pattern functions M and which consist of the filtering coefficients of the STAP filter transformed into the frequency domain, are determined on the basis of a covariance matrix of the filtering coefficients and its resolvents.

16. The apparatus according to claim 15, wherein the product terms are determined by the multiplication of the last line of the covariance matrix with the first column of its resolvents.

17. A computer readable medium encoded with a computer program for correcting azimuthal position of moving objects in a synthetic aperture radar image comprising multi-channel range/Doppler measurement data X with $N_{DZ}$ Doppler resolution cells, by:
defining a family of $N_{DZ}$ pattern functions M, based on filtering coefficients $\alpha$ and $\beta$ for Space-Time Adaptive Processing, transformed into the frequency domain;
defining a testing function based on the filtering coefficients $\alpha$ and $\beta$ transformed into the frequency domain and on the multi-channel range/Doppler measurement data;
generating a correlation function K by correlating the testing function T with a selected function of the family of pattern functions M; and
computing a true azimuth position of a moving target based on the position of a maximum of the correlation function K.

18. The method according to claim 17, wherein the family of pattern functions M in the case of two-channel range/Doppler measurement data is determined corresponding to the equation $$M(k, i) = 20 \cdot \log(|\alpha(i) \cdot \beta(k) - \beta(i) \cdot \alpha(k)| + \epsilon)$$

wherein $1 \leq k \leq N_{DZ}$ and $1 \leq i \leq N_{DZ}$.

19. The method according to claim 17, wherein the testing function T in the case of two-channel range/Doppler measurement data is determined at the point of a defined distance cell $\omega$ and for a defined Doppler resolution cell $\rho$ corresponding to $$T(i) = 20 \cdot \log\left(\left|\frac{\alpha(i) \cdot X_1(\omega, \rho) + \beta(i) \cdot X_2(\omega, \rho)}{X_1(\omega, \rho) \cdot X_1^*(\omega, \rho) + X_2(\omega, \rho) \cdot X_2^*(\omega, \rho)}\right| + \varepsilon\right)$$

wherein $1 \leq i \leq N_{DZ}$.

20. The method according to claim 17, wherein:
the correlation function K corresponds to a correlation of the testing function T with the selection of one from the $N_{DZ}$ pattern functions M; and
that pattern function is selected for the correlation which is to be assigned to the point m for which the cross-correlation of the range/Doppler measurement data r is maximal, corresponding to $|r(m)| \geq |r(i)|$ with $1 \leq i \leq N_{DZ}$, so that the correlation function K is generated corresponding to the equation $$K(1 \ldots N_{DZ}) = |\mathit{ifft}\{\mathit{fft}(T(1 \ldots N_{DZ})) \cdot \mathit{fft}(M(m,1 \ldots N_{DZ}))^*\}|$$

wherein $1 \leq i \leq N_{DZ}$.

* * * * *